US007980953B2

(12) United States Patent
von Ahn Arellano

(10) Patent No.: US 7,980,953 B2
(45) Date of Patent: Jul. 19, 2011

(54) METHOD FOR LABELING IMAGES THROUGH A COMPUTER GAME

(75) Inventor: Luis von Ahn Arellano, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 1698 days.

(21) Appl. No.: 10/875,913

(22) Filed: Jun. 24, 2004

(65) Prior Publication Data

US 2005/0014118 A1    Jan. 20, 2005

Related U.S. Application Data

(60) Provisional application No. 60/483,976, filed on Jul. 1, 2003.

(51) Int. Cl.
*A63F 13/00* (2006.01)
(52) U.S. Cl. .......................................... 463/42; 463/31
(58) Field of Classification Search .................... 463/42, 463/30, 31
See application file for complete search history.

(56) References Cited

FOREIGN PATENT DOCUMENTS

| JP | HEI07-148350 | 6/1995 |
|----|---|---|
| JP | 2002-035411 | 2/2002 |
| JP | 2002-051282 | 2/2002 |
| JP | 2002-159741 | 6/2002 |
| JP | 2002-175135 | 6/2002 |
| JP | 2002-253840 | 9/2002 |

OTHER PUBLICATIONS

IEEE Supervised Learning of Semantic classes for Image Annotation and Retrieval.*
Louis Vuurpijl et al. Vind(x): using the user through cooperative annotation.*
Nintendo Super Mario Kart, 1992.*
Homepage of Hot or Not available at website: http://web.archive.org/web/20030401170111/http://www.hotornot.com, 3 pgs.
L. Von Ahn and L. Dabbish, Labeling Images with a Computer Game, ACM-CHI, Apr. 2004, pp. 319-326, vol. 6, No. 1, Vienna, Austria.

(Continued)

*Primary Examiner* — James S McClellan
(74) *Attorney, Agent, or Firm* — Fenwick & West LLP

(57) ABSTRACT

A methodology to determine the contents of an image uses an online game that is played by a large number of people at once. Each player may be randomly assigned a partner to form a pair. Partners do not know each other's identity and cannot communicate with one another. Players cannot see what their partners are typing, and the only thing the two partners have in common is an image that they can both see. One object of the game is to have each player type exactly what his or her partner is typing or has already typed. Once both players type the same string of words or letters, they receive a new image (the players are not required to type the string at the same time). The string upon which the two players agree is used as a label for that image. When trying to agree on a word, players may not be able to type certain specific strings of characters or "forbidden words". When humans play the electronic game (online or over the Internet), they help computers determine the contents of images. If played by a large number of people, this game could provide a resource capable of classifying a vast portion of images on the World Wide Web. Because of the rules governing abstracts, this abstract should not be used to construe the claims.

27 Claims, 2 Drawing Sheets

OTHER PUBLICATIONS

L. Dabbish and R. Kraut, Coordinating Communication: Awareness Displays and Interruption, ACM-CHI, Apr. 2003, pp. 786-787, Ft. Lauderdale, FL.

European Patent Office, Patent Abstracts of Japan, Abstract for Publication No. 08016807, Jan. 19, 1996, 1 pg., Japan.

Homepage of Corbis available at website: http://pro.corbis.com/default.aspx on Jun. 17, 2004, 1 pg.

Homepage of Gettyimages available at website http://www.gettyimages.com/source/home/home.aspx on Jun. 17, 2004, 1 pg.

P. Duygulu, et al., Object Recognition as Machine Translation: Learning a Lexicon for a Fixed Image Vocabulary, 15 pgs., Berkeley, CA.

H. Schneiderman, et al., Object Detection Using the Statistics of Parts, Int'l. Journal of Computer Vision, 2002, 58 pgs.

* cited by examiner

Player 1 guesses: man
Player 1 guesses: camera
Player 1 guesses: film
Success! You agree on "camera"

Player 2 guesses: guy
Player 2 guesses: camera
Success! You agree on "camera"

METHOD FOR LABELING IMAGES THROUGH A COMPUTER GAME

REFERENCE TO RELATED APPLICATION

The disclosure in the present application claims priority benefits of the earlier filed U.S. provisional patent application Ser. No. 60/483,976, titled "Method For Labeling Images Through A Computer Game," filed on Jul. 1, 2003, the entirety of which is hereby incorporated by reference.

STATEMENT REGARDING FEDERALLY SPONSORED RESEARCH

The invention in the present application was made under a grant from the National Science Foundation grants CCR-0122581 and CCR-0085982. The United States federal government may have certain rights in the invention.

BACKGROUND

1. Field of the Disclosure

The present disclosure generally relates to labeling of images with words and, more particularly, to a method to determine the contents of an image through a computer game.

2. Brief Description of Related Art

There are millions of images on the World Wide Web portion of the Internet (conveniently referred to hereinbelow as "the Internet") and it is important to have a method that can assign word descriptions to each image (so that the images can be searched and indexed, for instance). Writing a program that can automatically label images in any meaningful way is still impossible. Even recognizing slightly distorted text—a much simpler sub-problem—is hard for current computer programs. To get around this, image search engines on the World Wide Web label images according to file names: an image named "car.jpg", for instance, is labeled as an image of a car. This method, though somewhat successful, is clearly not optimal. First, there is no reason for anybody other than the person who originally posted the image file to name it accurately, and second, a single file name is not enough to describe the contents of an image. Text appearing adjacent to the images in web pages can also be used as an aid in the labeling process, but most images have little or no associated text, and even when such text is present it can be difficult to process and is oftentimes unstructured and misleading. Thus a significant percentage of all images on the World Wide Web are incorrectly labeled and cannot be found through reasonable search queries.

A possible solution to this problem is manual labeling. Manually labeled image databases such as the Corbis Collection and the Getty Images (which can be viewed at www.corbis.com and www.gettyimages.com, respectively) allow for very accurate search results. However, manually classifying all images on the World Wide Web could be extremely expensive given the sheer volume of the image collection over the Internet (there are over 1 billion images on the World Wide Web at this time).

Over the years there has been considerable artificial intelligence work in the area of automatic determination of the contents of images. The most successful attempts learn from large databases of annotated images (annotations typically refer to the contents of the image, and are fairly specific and comprehensive). Some of these methods cluster image representations and annotations to produce a joint distribution linking images and words. Such methods can predict words for a given image by computing the words that have a high posterior probability given the image. Other algorithms attempt to combine large semantic text models with annotated image structures. Though impressive, such algorithms based on computer learning do not work very well in general settings and work only marginally well in restricted settings. For example, the work described in Duygulu, P., Barnard, K., de Freitas, N., and Forsyth, D. A., *Object recognition as machine translation: Learning a lexicon for a fixed image vocabulary*, (Seventh European Conference on Computer Vision, 2002, IV 97-112) only gave reasonable results for 80 out of 371 vocabulary words (the evaluation procedure in this study consisted of searching for images using the vocabulary words, and only 80 queries resulted in reasonable images).

Another line of work that is relevant is one that attempts to find specific objects within images. Schneiderman and Kanade (*Object Detection Using the Statistics of Parts*, International Journal of Computer Vision, 2002), for instance, introduced a method to locate human faces in still photographs. Such algorithms are typically accurate, but have not been developed for a wide range of objects. Additionally, combining algorithms for detecting different objects into a single general-purpose classifier is a non-trivial task. Thus, even a method that can produce reasonable labels (not necessarily good labels) for images in general is desirable.

SUMMARY

Millions of people around the world play computer games. The present application introduces a game that is fin to play, and which can be used to determine the contents of an image. The game may be deployed at one or more popular gaming sites through which individual players can access and play the game online (i.e., over the Internet).

In one embodiment, the present disclosure contemplates a method that comprises the following steps to be performed electronically: selecting at least two participants from a plurality of participants; presenting an image to each selected participant; and requesting each selected participant to provide a description of the image.

In another embodiment, the present disclosure contemplates a method that comprises: providing access to an online electronic game to a plurality of participants over a communication network; selecting two participants from the plurality of participants; presenting an image to the selected two participants so as to enable both of the selected participants to view the image; and receiving from each of the two selected participants at least one content-identifying term for the image.

In a still further embodiment, the present disclosure contemplates a method that comprises: providing an online electronic game to a plurality of participants; randomly selecting two participants from the plurality of participants; presenting an image as part of the electronic game to enable the selected participants to view the image; and requesting the two selected participants to agree on a term describing the image.

The present disclosure relates to a two-player game that is meant to be played online by a large number of people at once. Each player is randomly assigned a partner. Partners do not know each other's identity and cannot communicate with one another. Players cannot see what their partners are typing, and the only thing two partners have in common is an image that they can both see. One object of the game is to have each player type exactly what his or her partner is typing or has already typed (e.g., both players must provide the same description of the image they are viewing). Once both players type the same string of words or letters, they get a new image (the players are not required to type the string at the same time). The string upon which the two players agree is used as a label for that image. In one embodiment, partners have to "agree" on as many images as they can in a certain amount of time. Some words might be restricted (e.g., although accurate, certain words are not allowed to be used, such as words that have already been agreed upon by other players who have described the same image previously), i.e., when trying to agree on a word, players may not be able to type certain specific strings of characters or "forbidden words".

BRIEF DESCRIPTION OF THE DRAWINGS

For the present disclosure to be easily understood and readily practiced, the present disclosure will now be described for purposes of illustration and not limitation, in connection with the following figures, wherein.

DETAILED DESCRIPTION

Reference will now be made in detail to some embodiments of the present disclosure, examples of which are illustrated in the accompanying figures. It is to be understood that the figures and descriptions of the present disclosure included herein illustrate and describe elements that are of particular relevance to the present disclosure, while eliminating, for the sake of clarity, other elements found in typical online games or Internet-based program applications. It is noted at the outset that the terms "connected", "connecting," "electrically connected," etc., are used interchangeably herein to generally refer to the condition of being electrically connected. It is noted further that, for the sake of brevity and convenience, the term "image" is used hereinbelow to refer to not only static images, but also to sound cli
and video clips, either individually or in combination, depending on the implementation of the online labeling game according to the present disclosure. That is, the methodology described hereinbelow to label static images may also be used to provide content-identifying terms for sound cli
and video cli
as well.

Figure 1:
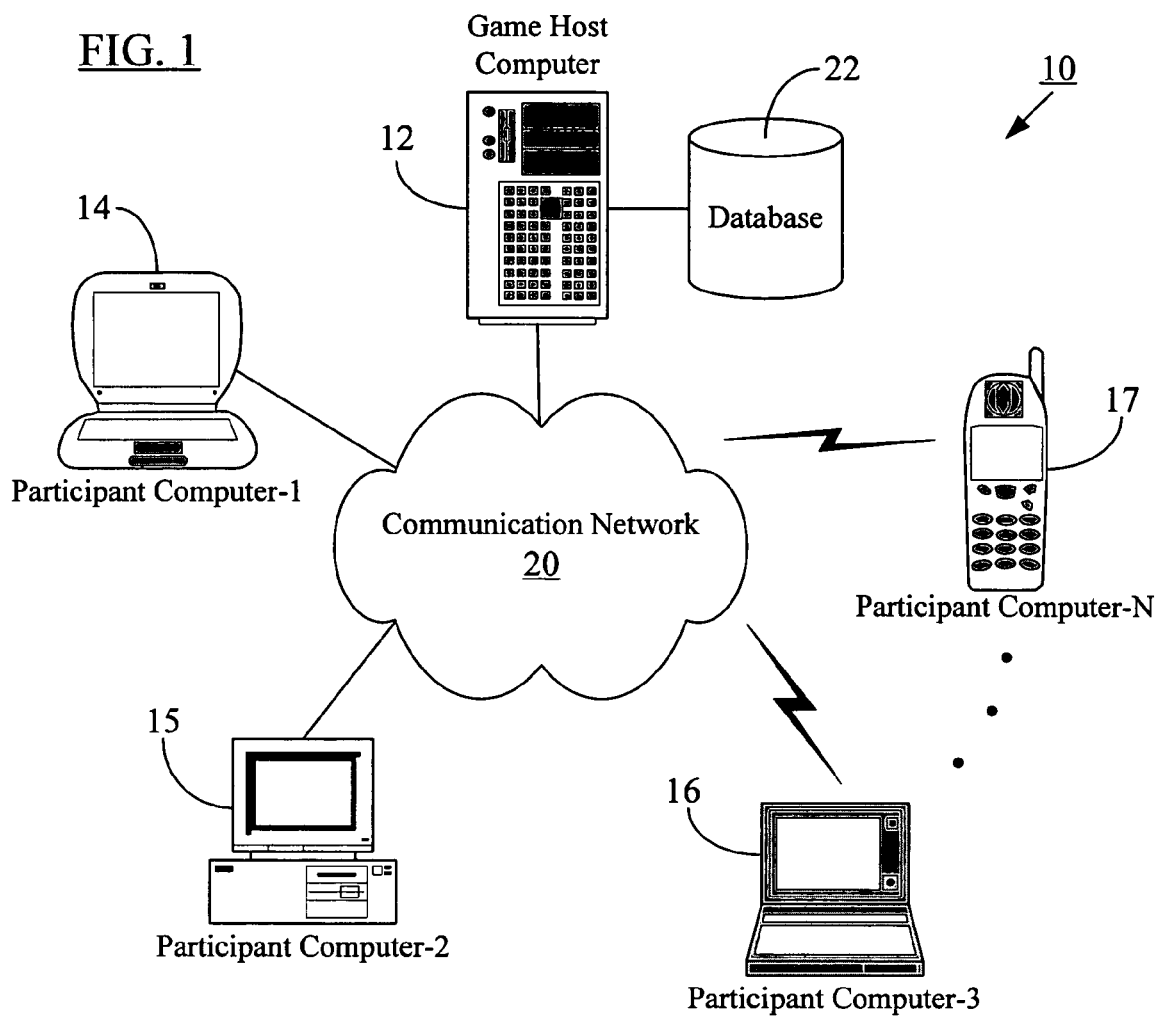
FIG. 1 illustrates a simplified view of a hardware configuration that may be used to facilitate the online image labeling game according to one embodiment of the present disclosure.

FIG. 1 illustrates a simplified view of a hardware configuration 10 that may be used to facilitate the online image labeling game according to one embodiment of the present disclosure. The configuration 10 may include a game host computer 12 connected to a plurality of participant computers 14-17 via a communication network 20. The host computer 12 may be an individual server or a distributed computing platform operating in, for example, a Microsoft Windows® environment. In an alternative embodiment, instead of a Windows®-based operating system, the host computer 12 may employ a Unix®-based or Linux®-based operating system as is known in the art. Similarly, there may be various types of participant computers or computing units 14-17 connected to the network 20. For example, some of the participant computers may operate on Windows® operating system, whereas others may use the Linux® operating system, and still others may operate on the Palm® operating system. Some of the participant computers (e.g., computing units 16 and 17) may be connected wirelessly to the communication network 20. The computing units may be in the form of desktop or notebook computers, cell phones, or PDA's (Personal Digital Assistants). The exact type and configuration of the participant's computing unit is not relevant to the present disclosure. It is, however, preferred that the participant's computer be able to connect to the communication network 20 via suitable means and also be able to communicate with the host computer 12 using a common protocol (e.g., TCP/IP (Transmission Control Protocol/Internet Protocol) for communication over the Internet) so as to enable the computer's use to participate in the online game-playing.

The communication network 20 may be any type of computer or data communication network. In one embodiment, the communication network 20 is the Internet. In that embodiment, various participants may interactively play the image labeling game according to the present disclosure over the Internet 20. The set of program instructions or software to facilitate such game playing may reside on the host computer 12, which may execute the software to allow participant computers (and, hence, the participants themselves) to interact with one another (as described hereinbelow) and also to interact with the host computer 12 itself. In one embodiment, the software for the online game may be stored on a portable data storage medium (e.g., one or more floppy diskettes, compact discs, external hard drives, etc.) (not shown) and installed in the host computer 12 when needed. In that event, the software, upon execution by the host computer 12, may configure the host computer to facilitate the online game playing described hereinbelow.

In one embodiment, the host computer 12 may access a local database 22 containing a large number of images to be labeled. The host 12 may pick individual images from the database 22 and supply them to various game partners as described hereinbelow. Alternatively, the database 22 may be in a distributed form (i.e., residing at a plurality of websites or host locations) or may be created during run time. In the latter implementation, the host computer 12 may access a number of Internet websites and randomly collect the images therefrom to be supplied to the participants. These images may then also be stored in the database 22 along with corresponding content-identifying terms for the images received from the participants (as discussed below).

As mentioned hereinbefore, the image-labeling game according to the present disclosure is preferably a two-player game, but it is meant to be accessed on-line and played by a large number of people at once. Furthermore, it is conceivable that, in one embodiment, more than two players may also receive an identical image and "annotate" the image in the manner similar to that described hereinbelow with reference to image content identification by only two players. It is noted here that the two players or "partners" may be selected randomly from the group of participants (who communicate to the host computer 12 via their respective computing units 14-17) playing the image-labeling game according to the present disclosure. It is preferable that the two players do not know each other's identity. Furthermore, the two players in each selected pair of participants may not communicate (using their respective computers, for example) with each other. Additionally, it is preferable that players should not be allowed to see what their partners are typing, and the only thing two partners have in common is an image that they can both see.

Figure 2:
FIG. 2 shows an exemplary image that may be presented to players of the image labeling game and several exemplary steps leading to an agreement upon a description of the image.

One object of the game is to encourage or request a participant to guess what the participant's partner is typing. Once both players type the same string (of text letters or words), the current image may be removed from their view and, instead, they may get a new image for content identification. FIG. 2 shows an exemplary image 24 that may be presented to players of the image labeling game and several exemplary ste leading to an agreement upon a description of the image. It is observed from FIG. 2 that the players need not type the strings simultaneously. For example, as shown in FIG. 2, the response from one player (e.g., Player 2 in FIG. 2) may be time-wise delayed from that of the other player in the pair. In FIG. 2, the two players continue guessing the content-identifying term for the image 24 until both of them guess the common term "camera." Although Player 1 in FIG. 2 continues guessing an additional term ("film") after typing "camera," the software of the game may ignore the additional term and conclude that a successful match has been established for the term "camera" so long as there is an identical guess received from Player 2, even though the response from Player 2 is time-delayed. That is, the game may store all the entries or guesses received from both of the players until a match occurs, regardless of the order in which the matching term has been guessed by both of the players. Thus, both of the players may not have to guess the identical content descriptive term simultaneously to obtain a success at labeling the image 24 at hand. After successful and timely completion of content identification, the present image 24 may be removed from the players' view and replaced with another image as discussed hereinbelow with reference to FIG. 3.

In one embodiment of the present image labeling methodology (as implemented through an online electronic game), partners may have to "agree" on as many images as they can in a certain amount of time (e.g., 90 seconds). Since the players cannot communicate and do not know anything about each other, the easiest way for both to type the same string is by typing something related to the common image. It is noted, however, that the game does not have to ask the players to describe the image: all the players know is that to agree on an image, they must "think like each other" and type the same string. The string that players agree on may be used as a label for that image. All other words or strings that players enter may also be used as labels or to obtain information about the image.

Figure 3:
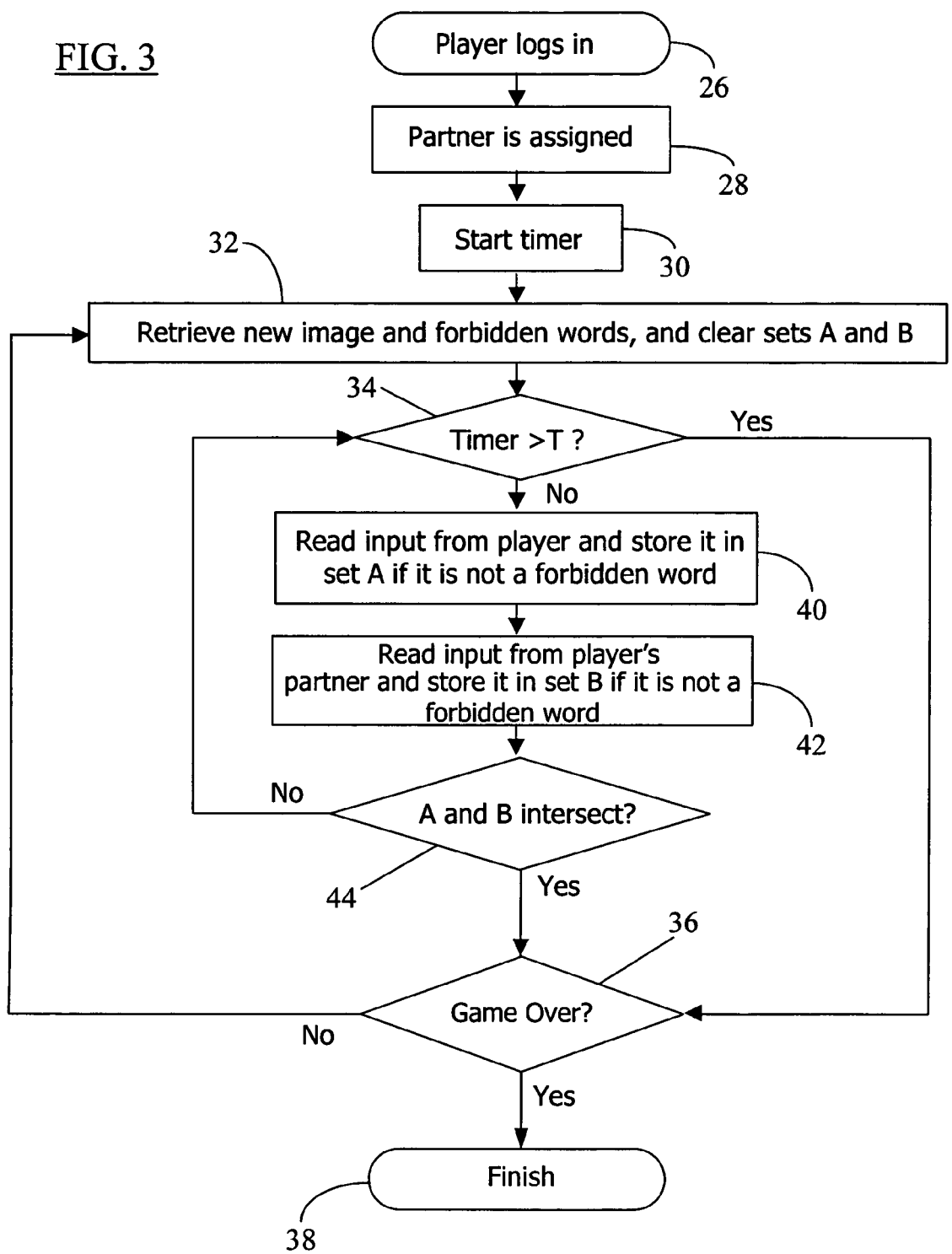
FIG. 3 depicts an exemplary process flow diagram of the online image-labeling game according to one embodiment of the present disclosure, including provisions for excluding "forbidden words."

FIG. 3 depicts an exemplary process flow diagram of the online image-labeling game according to one embodiment of the present disclosure, including provisions for excluding "forbidden words." After a player logs into the host computer 12 (using the player's or participant's respective computing unit) offering the image-labeling game (block 26), the game software in the host computer 12 may randomly assign a game partner (block 28) to the player as described hereinbefore. The partner may be another similar player/game participant just logging in, or a player in need of a partner to commence and play the game. The partner assignment establishes a pair of participants/players ready to participate in the image labeling game. The game control software may then commence a timer (block 30) for the current pair of participants. Simultaneously with starting the game timer (block 30), the software may select and retrieve (e.g., from the database 22) a new image to be sent to the computer terminals of both players so that the players can view an identical image on their computers (block 32). The software may also retrieve any "forbidden words" associated with the selected image (and may have been stored in the database 22 along with the image) and may clear two data storage sets—set A for one player and set B for another player—that may be assigned to the two players in the pair to store image content-identifying text entries/responses received from the players during the game.

As noted hereinbefore, some images may have "forbidden words" associated with them. Players should not type an image's forbidden words, nor should they type singulars, plurals or phrases related to the forbidden words. In any event, a forbidden word entered by a player may not be accepted by the game control software, requiring the player to input another word in place of the forbidden word to continue playing the game. In one embodiment, the "forbidden words" may be obtained from the game itself—i.e., the first time an image is used in the game, it will have no forbidden words; however, if the image is ever used again, it will have one forbidden word: the word that resulted from the previous classification by a previous pair of players. It is noted that forbidden words may not necessarily be actual words in any language. However, prohibited expletives or foul language may be considered part of the "forbidden words," and hence not considered a valid entry by a player. The use of "forbidden words" may allow for quite specific labels. For example, the first time around, without any forbidden words, the label of an image may be expected to be a very general one, like "man." However, subsequent classifications dictated by previously entered "forbidden words" may become progressively more specific because, for example, unable to use the term "man," players may start giving answers about how the man is dressed or what he is doing.

Referring again to FIG. 3, after retrieving and sending an identical image to both players, the game control software may monitor the timer to determine whether the predetermined time period (T) has elapsed (decision block 34). If the predetermined time duration (e.g., T=90 seconds) has elapsed without obtaining an identical match between the content-identifying terms received from both the players, the game control software may check at decision step 36 whether one or both of the players have indicated to stop the game (e.g., by logging out of the game, or by a prolonged period of inactivity). If the game is to be concluded, then the software finishes the game and sends appropriate game conclusion message to both the players at block 38. However, if the game is to be continued despite no timely matching responses from both the players, the game control software may instruct the host computer 12 to retrieve another image from the database 22 and send this new image to the players' computer terminals (block 32). In this case, the older image may not be displayed to the players any more because the new image may replace the older image on a player's computer screen or other display terminal (e.g., a cell phone display or a PDA display). The paired players may then continue content identification of the most-recently received new image as indicated at blocks 40, 42, and 44 in FIG. 3.

If the timer has not run out at step 34, the game control software may continue to wait for and receive the content-identifying texts from both the players. At block 40, the software may receive the input text from one of the players and store it in the database 22 in data storage set A so long as the text does not contain any forbidden word(s). Similarly, at block 42, the software may receive the image content-identifying entries from the other player and store the entries in the data storage set B so long as the entries do not contain any forbidden word(s). It is observed here that so long as the timer value is less than the predetermined time limit for content identification of the current image, the software may continue receiving text entries from one or both the players as shown, for example, in FIG. 2, where Player 1 has input more entries than Player 2 before a match is established. That is, a player may input his/her entries regardless of whether the player's partner has input any corresponding entry. The player may not need to wait for the partner's response to enter his/her strings. In one embodiment, the players may be allowed to agree on and remotely set the time limit (T) per game. In that event, the software may accept the value of T indicated by the players and start/stop the timer accordingly.

At the decision block 44, the game control software continually compares the input strings stored in sets A and B to check whether any of the string pairs intersect, i.e., whether there is an identical string received from each of the two players. In the absence of the identical match, the software may continue to receive more entries from the players, so long as the timer has not run out (as indicated by the process loop between blocks 44 and 34). On the other hand, if there is an identical entry stored in both sets A and B, then the software may determine that a match has been found and, hence, may conclude the game of content identification of the present image and may continue the game with a new image so long as the "Game Over" indication is absent, as indicated by the process loop between blocks 36 and 32. The game may thus continue for each new image and for each pair of participating players.

It may be desirable that the images used by the game be interesting to the participants. For example, the game may perha
be less entertaining if all the images were chosen from a single website containing second by second shots of an almost still scene. Similarly, different people may enjoy playing with different sets of images, and several images found online may not be appropriate for all audiences. Such issues should be considered when writing a full-scale implementation of the game. In the most basic setting, the images may be chosen at random from the World Wide Web with a small amount of filtering: no blank images, no images that consist of a single color, no images that are smaller than 4×4 pixels, etc. More specific "theme rooms" may be created for those who wish to play the game using only certain types of images. Some players may want images coming from certain domains or with specific types of content. Such selection options may be provided to players in "theme rooms." Images for these "theme rooms" may be obtained either using web directories or the classifications given by the "general category" game—i.e., the classifications obtained as part of the basic image labeling game offered to all participants, regardless of their sophistication or advanced status.

In one embodiment, the online image labeling game according to the present disclosure may be offered to participants either for free or for a nominal charge (in the form of, for example, a monthly subscription fee to the game-offering website, a flat fee for a fixed amount of game playing time (e.g., 60 minutes), or a charge per game). In an alternative embodiment, to encourage participation of a larger audience, the game hosting website may offer "reward" to participants in terms of, for example, game points redeemable for select online merchandise or souvenirs offered by the host website. Furthermore, to maintain participants' continued interest in the game, the host website may offer online image-labeling tournaments or team activities to determine winning players who "agree" on the most number of images in the shortest time interval. Other business objectives may be used to publicize the game and make it a success.

It is noted here that although the online labeling game has been described hereinabove with reference to two players, the game may be devised in a single player version. In that embodiment, a single player can play with a pre-recorded set of actions as his/her "partner." This set of actions may be recorded at an earlier time when two other people were playing the game simultaneously. For each image, every guess of each partner in the earlier pair of players may be recorded, along with timing information. Thereafter, whenever a single player wants to play the game, the player may be paired with a pre-recorded set of actions. In this approach, the single player is basically playing with somebody else, but not at the same time. Each guess/input from the single player may be responded with a guess in the pre-recorded set until a match is found.

As noted before, automatic determination of the contents of an image may be a problem far from being solved by computer vision techniques. Thus, the foregoing describes a methodology that introduces a simple electronic game that is fun to play and is able to harness human resources to obtain content identification or labeling of a large number of images online. When humans play the game online (or over the Internet), they help computers determine the contents of images. If played by a large number of people, this game could provide a resource capable of classifying a vast portion of images on the World Wide Web. The image labeling game according to the present disclosure represents an interaction between humans and computers, a symbiosis in which humans playing the game are entertained and computers running the game obtain answers to problems they may not be able to solve efficiently.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A method comprising:
selecting at least two participants from a plurality of participants and grouping the at least two participants;
presenting a first image to the at least two selected participants;
receiving from each of the at least two selected participants, a content-identifying term for said first image;
determining, via a computer system, if the content-identifying term received from the at least two selected participants match; and
responsive to determining that the content-identifying terms match and that the matching content-identifying terms are not included in a list of forbidden terms, storing the matching content-identifying term as a label for the first image, and adding the matching content-identifying term to the list of forbidden terms.

2. The method of claim 1, wherein said selecting is performed randomly.

3. The method of claim 1, wherein said content-identifying term is a written text input electronically by each of the at least two selected participants.

4. The method of claim 1, wherein said selecting the at least two participants includes:
pairing two of said plurality of participants without disclosing an identity of one participant to the other and without disclosing the content identifying term provided by one participant to the other participant.

5. The method of claim 1, wherein said presenting the first image includes:
accessing a database storing a plurality of images; and
selecting one of said plurality of images to be presented as said first image to each said selected participant.

6. The method of claim 5, wherein selecting one of said plurality of images includes randomly selecting said one of said plurality of images in said database as said first image.

7. The method of claim 1, further comprising:
storing said content-identifying terms of said first image provided by each said selected participant;
comparing the content-identifying terms received from each said selected participant for similarity as each content-identifying term is received; and
presenting a second image to each said selected participant when the content-identifying terms of said first image received from each said selected participant match.

8. The method of claim 7, wherein presenting said second image includes removing said first image from the view of each said selected participant.

9. The method of claim 1,
wherein the matching content-identifying term is stored responsive to the matching content-identifying term further not being
a textual variation related to a forbidden term in the list of forbidden terms.

10. A method, comprising:
selecting two participants from said plurality of participants and pairing the two selected participants;
presenting a first image to said selected two participants so as to enable both of said selected participants to view said first image;
receiving from each of said two selected participants at least one content-identifying term for said first image; and
responsive to determining, via a computer system, that the content-identifying terms match, storing the content-identifying term as a label for the first image and presenting a second image to the selected two participants so as to enable both of the selected participants to view the second image.

11. The method of claim 10, wherein said providing includes one of the following:
offering an online electronic game over a communication network on a subscription-basis to said plurality of participants; and
charging two or more of said plurality of participants on a per-game basis for said online electronic game.

12. The method of claim 11, wherein said communication network is the Internet.

13. The method of claim 12, wherein said providing includes:
hosting said online electronic game at a web site on the Internet; and
allowing each said participant to access said website using a computing unit.

14. The method of claim 10, wherein said selecting includes:
pairing two of said plurality of participants without disclosing an identity of one participants to the other and without disclosing the content-identifying term provided by one participant to the other participant.

15. The method of claim 10, wherein said presenting includes:
accessing a database storing a plurality of images over a communication network; and
selecting one of said plurality of images to be presented as said first image to each of said two selected participants.

16. The method of claim 15, wherein selecting one of said plurality of images includes randomly selecting said one of said plurality of images.

17. The method of claim 10, wherein said content-identifying term is a written text.

18. The method of claim 10, further comprising:
presenting the second image to the first and second participants responsive to a predetermined time period elapsing without receiving the matching content-identifying terms from said two selected participants.

19. The method of claim 18, wherein presenting said second image includes removing said first image from the view of both of said selected participants.

20. The method of claim 10,
wherein the content-identifying terms are not stored as a label for the first image responsive to the content identifying term comprising at least one of:
a word that has already been used as part of said corresponding content-identifying term for said first image;
a textual variation related to said word; and
a forbidden term.

21. A method, comprising:
selecting two participants from said plurality of participants and pairing the two selected participants;
presenting a first image to the selected participants; and
receiving content-identifying terms describing the image from each of the two selected participants;
responsive to the content-identifying terms received from the two selected participants matching and both of the content-identifying terms being received within a predetermined time period, storing the matching content-identifying term in a data storage medium as a label for the first image; and
responsive to the predetermined time period expiring prior to the two selected participants providing the matching content-identifying term, presenting a second image to the selected participants.

22. The method of claim 21, wherein said requesting includes:
inviting each of said two selected participants to input a term for said image within a predetermined time.

23. A method comprising:
selecting two participants from a plurality of participants;
presenting a first image to each of said two selected participants;
receiving from each of said two selected participants at least one content-identifying term for said first image;
removing said first image from the view of both of said selected participants, via a computer system, and presenting a second image to said selected two participants upon occurrence of one of the following:
receiving from each of the two selected participants a matching content-identifying for the first image, wherein the matching content-identifying term is not included in a list of forbidden terms; and
a predetermined time period elapsing prior to receiving the matching content-identifying term not included in the list of forbidden terms from each of said two selected participants.

24. A data storage medium containing program instructions, which, when executed by a processor, cause said processor to perform the following:
select two participants from said plurality of participants and pairing the two selected participants;
present a first image to the selected participants; and
receive a content-identifying term describing the image from each of the two selected participants;
responsive to the content-identifying terms received from the two selected participants matching and both of the content-identifying terms being received within a predetermined time period, store the matching content-identifying term as a label for the first image; and responsive to the predetermined time period expiring prior to the two selected participants providing the matching content-identifying term, present a second image to the selected participants.

25. The data storage medium of claim 24, wherein said program instructions, upon execution, cause said processor to further perform the following:

invite each of said two selected participants to input an identical term for said image within a predetermined time.

26. A method comprising:

selecting a first participant and a second participant from a plurality of participants and pairing the first and second participant;

presenting an image to each of said first and said second participants;

receiving a plurality of terms describing the image from each of said first and said second participants;

recording the received plurality of terms describing the image from each of said first and said second participants;

presenting said image to a third participant from said plurality of participants;

receiving a content-identifying term for the image from said third participant; and supplying to said third participant, via a computer system, a different recorded term from said recorded plurality of terms in response to each content-identifying term for said image supplied by said third participant.

27. The method of claim 26, further comprising:

responsive to the content-identifying term from the third participant matching a recorded term from the recorded plurality of terms, presenting a second image to the third participant and storing the matching content-identifying term as a label for the first image.

\* \* \* \* \*